3,080,355
METHOD OF SEPARATING THE ENDOSPERM FROM THE EMBRYO AND HUSKS OF SEEDS
Ernst Müller, Kilchberg, Zurich, Switzerland, assignor to Meypro AG., Kreuzlingen, Switzerland
No Drawing. Filed Feb. 16, 1960, Ser. No. 8,927
Claims priority, application Germany Feb. 18, 1959
10 Claims. (Cl. 260—209)

The seeds to which the present description refers consist primarily of the endosperm (fruit body), the embryo and the husk.

In the case of the method here described it is a question of separating as completely as possible the residues of the embryos and the husks, which adhere firmly to the endosperm, from the latter so as to obtain in this manner the endosperms, consisting of polysaccharides, particularly galactomannan, in as pure a state as possible. Hereinafter these polysaccharides will be referred to as G-substance, the embryos and husks as accompanying bodies or impurities.

In this sense the rotten brown or black seed kernels, which are always present in raw seeds, are considered as accompanying bodies.

According to the methods hitherto known for obtaining, for example guar flour, the seeds are split in special crushing mills and thereby separated into so-called seed flakes and the embryos. The flakes consist of the fruit bodies with the firmly adhering husks and the residues of embryos.

By further grinding processes these flakes are worked into a fine flour, whereby a small portion of the husks can be separated from the G-substance, for example, by air sifting. A large portion of the husks cannot, however, be removed in this manner. Moreover, relative large quantities of embroyos remain in the so-called guar flour.

Methods are likewise known whereby the husks and embryos are loosened or disintegrated by treating raw seed for example with aqueous alkalis. In this manner a better cleaning of the polysaccharides can be attained. The great disadvantages of this method consist in that, during the treatment of the said seeds with aqueous solutions, the polysaccharides absorb a great deal of water and swell and thus make the carrying out of the method very much more difficult or in special cases even impossible. When the galactomannans are to be obtained in dry state, the products containing a large quantity of water must be dried by introducing a relatively large quantity of heat, which considerably adds to the cost of production.

As above mentioned, the new method has for its object to separate the impurities from the G-substance as completely as possible. The so-called seed flakes are available as initial material for the new method hereinafter described.

It has been found that the boiling or disintegration of embryos and husks with, for example, aqueous alkalis such as, for example, 2–30% solution of caustic soda, can be carried out in the presence of salts. It was found that with the presence of salts the swelling of the polysaccharides can be checked so strongly that the technical carrying out of the method is considerably facilitated or made possible at all. Sodium sulfate, potassium acetate, ammonium chloride and the like can, for example, be used as salts which at least partly check, i.e. inhibit, the swelling.

It has also been found that very many inorganic (and organic) compounds, for example various salts of metals and alkaline earth metals combine (bond) with the G-substances in the presence of alkalis. By such combination, for example the solubility of the G-substances or their derivities in aqueous alkaline solutions is at least partly very strongly reduced. Likewise the capability of swelling or the affinity for water of these compounds or addition products is at least in some cases very considerably reduced. Organic or inorganic compounds which contain, for example, the elements Fe, Ni, Co, Cr, Cu, Pb, B, Si, Al, Bi, Ba, Mg, Ca and the like can react in this manner with the G-substances. For example, Fe-chloride, Cu-sulfate, Pb-acetate, Al-levulinate, Ba-chloride, Ca-chloride, borax, isinglass and the like, may be mentioned. The G-substance can be reacted at different pH values (acid, neutral, alkaline) with the compounds mentioned.

The fact that the water-solubility or the capability of swelling in water possessed by the G-substances can be very greatly reduced by adding the said "checking agents" separately or in combinations, permits a longer treatment time with diluted alkalis or by the separating or washing methods with water, without appreciably large losses of G-substance or too high, unrational absorption of water occurring thereby.

The polysaccharides treated with alkalis in the manner indicated can be further treated in the following manner:

(a) By washing the G-substance flakes on a screen, whereby the accompanying bodies, disintegrated into a fine sludge, are washed out, or (b) By floatation, whereby the, for example, only partly disintegrated accompanying bodies are carried off, for example by water, or (c) By air sifting, whereby the selectively dried accompanying bodies are blown out, and so forth.

By the formation of the above mentioned addition compounds of the G-substances with the different "checking agents" not only the above-mentioned reduction of the water-absorbing capacity, but also a change of the mechanical properties of the G-substances or flakes is attained in various cases and is very important for the technical carrying out of the further stages of the method. Whereas, for example, "non-checked" guar flakes, which have absorbed about the equivalent quantity by wei ht of water, can only be ground with very great difficulty, "checked" guar flakes with corresponding water content can be very easily disintegrated and otherwise treated.

The moist flours obtained in this manner are free flowing and can be very easily further treated in this form:

(a) Drying for example in a hot air drier;

(b) Cleansing by washing with water or salt solutions or water-alcohol mixtures or water-ketone mixtures or solvents and the like;

(c) Production of derivatives by, for example, enzymatic disintegration by oxidation or by substitution and the like;

(d) Production of water-soluble products by washing with acids for example in water-alcohol solutions and the like;

(e) Mixing with salts such as phosphates and the like and drying;

(f) Using without additional drying or cleaning or modifying processes.

The pure or technically pure G-substances or "checked" G-substances or otherwise modified G-substances obtained according to (a) and (b) can be used in a large variety of industries as swelling agents, thickening agents, dressings, adhesives, dispersing agents, disinfectants, softeners and the like.

The invention will be more clearly explained with the aid of the following examples:

EXAMPLE 1

*Use of Cu-Acetate as "Checking Agent"*

100 kgs. guar flakes in a mixture of
20 kgs. Cu-acetate
200 ltrs. water 4 kgs. hydrosulfite are boiled for about 2 minutes and then 30 kgs. NaOH are added and the mixture is treated for a further 15 minutes at about 100° C.

After this reaction time the Cu-G-substance flakes are washed with water, centrifuged and ground.

The flour obtained can be dried and may be used as preserving agent. It may also be washed with for instances 10% phosphoric acid/water-alcohol.

The pure white product obtained is soluble in acid or alkaline water and can be utilized, for example, as thickener.

EXAMPLE 2

Use of Na-*Silicate* as "Checking Agent"

100 kgs. guar flakes in a mixture of
180 ltrs. water
60 kgs. sodium silicate
10 kgs. Mg-oxide
30 kgs. NaOH
2 kgs. hydrosulfite are boiled for 15 minutes at 100–110° C.

After this reaction time the Si/Mg-guar flakes are washed with water, centrifuged and ground.

The moist or dried flour is easily soluble for example in acidified water, for example, diluted formic acid. The flour washed for example with phosphoric acid/alcohol/water can be used as thickening agent.

EXAMPLE 3

100 kgs. guar flakes in a mixture of
250 ltrs. water
20 kgs. calcium chloride
3 kgs. hydrosulfite are boiled for 2 minutes. After this time has elapsed 25 kgs. NaOH are added and the mixture is treated for a further 15 minutes.

At the end of this reaction time the Ca-guar flakes are washed, centifuged and ground.

The moist flour can be washed with phosphoric acid/alcohol and then dried. The products thus obtained can be used as thickeners in the foodstuff industry.

EXAMPLE 4

Use of Sodium Acetate as "Checking Agent"

100 kgs. guar flakes in a mixture of
200 ltrs. water
30 kgs. Na-acetate
30 kgs. NaOH are boiled for 5 minutes at 110° C.

After this reaction time the guar flakes are washed with water, and dried for example with methanol.

The ground product can by oxidation be converted into a thickener which can be utilized in the textile industry.

EXAMPLE 5

Use of Al-*Lactate* as "Checking Agent"

100 kgs. guar flakes in a mixture of
200 ltrs. water
15 kgs. Al-lactate
30 kgs. NaOH
5 kgs. Ca-hydroxide
5 kgs. Mg-hydroxide
4 kgs. hydrosulfite are boiled for 15 minutes at 80° C.

After this reaction time the Al flakes are washed with water, centrifuged and ground. The moist flour is washed with a solution of 10% formic acid in water/alcohol and transformed into a guar derivative by substitution. The products thus obtained are suitable, for example, for the surface treatment of paper.

EXAMPLE 6

Use of Borax as "Checking Agent"

100 kgs. guar flakes in a mixture of
150 ltrs. water
3 kgs. NaOH
2 kgs. borax
2 kgs. Mg-oxide
2 kgs. hydrosulfite are boiled for 20 minutes at 105° C.

After this reaction time the B-guar flakes are washed with water, centrifuged and ground.

The moist powder can be used for a substitution. The moist flour can be dried directly and comes into question, for example, for the sizing of paper.

The flour can be oxidized or the like in alkaline aqueous dispersion.

EXAMPLE 7

Use of Ba-*Chloride* as "Checking Agent"

100 kgs. guar flakes in a mixture of
300 ltrs. water
20 kgs. barium chloride
20 kgs. Ca-hydroxide
30 kgs. NaOH
3 kgs. hydrosulfite are boiled for 25 minutes.

At the end of this reaction time the Ba-G-grains are washed with water, centrifuged and ground.

The products thus obtained are clear soluble in acid solution. By mixing with complex formers such as, for example hexa-meta-phosphate or Chel 242 (Geigy) and the like these and other "checked" galactomannans can dissolve clear in alkaline solution.

I claim:

1. In a method of separating the endosperm consisting essentially of polysaccharides from the embryo and husk of seeds, the step of heating said seeds at a temperature of 60–110° C. in an aqueous alkaline solution of effective concentration and for a period of time sufficient to at least partially disintegrate the embryos and husks of said seeds, said aqueous alkaline solution containing at least one salt in an amount of between 2% and 60% of the weight of said seeds, which salt will reduce the affinity of said polysaccharides to water and thereby substantially inhibit swelling of the same, said salt being selected from the group consisting of the chlorides of iron, barium and calcium, the acetates of copper, lead and sodium, copper sulfate, aluminum levulinate, aluminum lactate, borax and sodium silicate, whereby separation of the endosperms is facilitated due to the substantial inhibition of swelling of the polysaccharides of the endosperm during the at least partial disintegration of said embryos and husks of said seeds.

2. In a method of separating the endosperm consisting essentially of polysaccharides from the embryo and husk of seeds, the step of heating said seeds at a temperature of 60–110° C. in a 2–30% aqueous caustic soda solution for a period of time sufficient to at least partially disintegrate the embryos and husks of said seeds, said aqueous caustic soda solution containing at least one salt in an amount of between 2% and 60% of the weight of said seeds which salt will reduce the affinity of said polysaccharides to water and thereby substantially inhibit swelling of the same, said salt being selected from the group consisting of the chlorides of iron, barium and calcium, the acetates of copper, lead and sodium, copper sulfate, aluminum levulinate, aluminum lactate, borax and sodium silicate, whereby separation of the endosperm is facilitated due to the substantial inhibition of swelling of the polysaccharides of the endosperms during at least partial disintegration of said embryos and husks of said seeds.

3. In a method of separating the endosperm consisting essentially of polysaccharides from the embryo and husk of seeds, the step of heating said seeds at a temperature of 60–110° C. for between about 5 and 25 minutes in a 2–30% aqueous caustic soda solution for a period of time sufficient to at least partially disintegrate the embryos and husks of said seeds, said aqueous caustic soda solution containing copper acetate in an amount of between 2% and 60% of the weight of said seeds as a salt reducing the affinity of said polysaccharides to water and thereby substantially inhibit swelling of the same in said aqueous caustic soda solution, whereby separation of the endosperms is facilitated due to the substantial inhibition of swelling of the polysaccharides of the endosperms during the at least partial disintegration of said embryos and husks of said seeds.

4. In a method of separating the endosperm consisting essentially of polysaccharides from the embryo and husk of seeds, the step of heating said seeds at a temperature of 60–110° C. for between about 5 and 25 minutes in a 2–30% aqueous caustic soda solution so as to at least partially disintegrate the embryos and husks of said seeds, said aqueous caustic soda solution containing sodium silicate in an amount of between 2% and 60% of the weight of said seeds as a salt reducing the affinity of said polysaccharides to water and thereby substantially inhibit swelling of the same in said aqueous caustic soda solution, whereby separation of the endosperms is facilitated due to the substantial inhibition of swelling of the polysaccharides of the endosperms during the at least partial disintegration of said embryos and husks of said seeds.

5. In a method of separating the endosperm consisting essentially of polysaccharides from the embryo and husk of seeds, the step of heating said seeds at a temperature of 60–110° C. for between 5 and 25 minutes in a 2–30% aqueous caustic soda solution so as to at least partially disintegrate the embryos and husks of said seeds, said aqueous caustic soda solution containing calcium chloride in an amount of between 2% and 60% of the weight of said seeds as a salt reducing the affinity of said polysaccharides to water and thereby substantially inhibit swelling of the same in said aqueous caustic soda solution, whereby separation of the endosperms is facilitated due to the substantial inhibition of swelling of the polysaccharides of the endosperms during the at least partial disintegration of said embryos and husks of said seeds.

6. In a method of separating the endosperm consisting essentially of polysaccharides from the embryo and husk of seeds, the step of heating said seeds at a temperature of 60–110% C. for between 5 and 25 minutes in a 2–30% aqueous caustic soda solution so as to at least partially disintegrate the embryos and husks of said seeds, said aqueous caustic soda solution containing sodium acetate in an amount of between 2% and 60% of the weight of said seeds as a salt reducing the affinity of said polysaccharides to water and thereby substantially inhibit swelling of the same in said aqueous caustic soda solution, whereby separation of the endosperms is facilitated due to the substantial inhibition of swelling of the polysaccharides of the endosperms during the at least partial disintegration of said embryos and husks of said seeds.

7. In a method of separating the endosperm consisting essentially of polysaccharides from the embryo and husk of seeds, the step of heating said seeds at a temperature of 60–110% C. for between 5 and 25 minutes in a 2–30% aqueous caustic soda solution so as to at least partially disintegrate the embryos and husks of said seeds, said aqueous caustic soda solution containing aluminum lactate in an amount of between 2% and 60% of the weight of said seeds as a salt reducing the affinity of said polysaccharides to water and thereby substantially inhibit swelling of the same in said aqueous caustic soda solution, whereby separation of the endosperms is facilitataed due to the substantial inhibition of swelling of the polysaccharides of the endosperms during the at least partial disintegration of said embryos and husks of said seeds.

8. In a method of separating the endosperm consisting essentially of polysaccharides from the embryo and husk of seeds, the step of heating said seeds at a temperature of 60–110% C. for between 5 and 25 minutes in a 2–30% aqueous caustic soda solution so as to at least partially disintegrate the embryos and husks of said seeds, said aqueous caustic soda solution containing borax in an amount of between 2% and 60% of the weight of said seeds as a salt reducing the affinity of said polysaccharides to water and thereby substantially inhibit swelling of the same in said aqueous caustic soda solution, whereby separation of the endosperms is facilitated due to the substantial inhibition of swelling of the polysaccharides of the endosperms during the at least partial disintegration of said embryos and husks of said seeds.

9. In a method of separating the endosperm consisting essentially of polysaccharides from the embryo and husk of seeds, the step of heating said seeds at a temperature of 60–110% C. for between 5 and 25 minutes in a 2–30% aqueous caustic soda solution so as to at least partially disintegrate the embryos and husks of said seeds, said aqueous caustic soda solution containing barium chloride in an amount of between 2% and 60% of the weight of said seeds as a salt reducing the affinity of said polysaccharides to water and thereby substantially inhibit swelling of the same in said aqueous caustic soda solution, whereby separation of the endosperms is facilitated due to the substantial inhibition of swelling of the polysaccharides of the endosperms during the at least partial disintegration of said embryos and husks of said seeds.

10. In a method of separating the endosperm consisting essentially of galactomannan from the embryo and husk of guar seeds, the steps of heating said seeds at a temperature of between 60 and 110° C. in 2–30% aqueous caustic soda solution for a period of time sufficient to at least partially disintegrate the embryos and husks of said seeds, said aqueous caustic soda solution containing at least one salt in an amount of between 2% and 60% of the weight of said seeds which salt will reduce the affinity of said galactomannan to water and thereby substantially inhibits swelling of the same, said salt being selected from the group consisting of the chlorides of iron, barium and calcium, the acetates of copper, lead and sodium, copper sulfate, aluminum levulinate, aluminum lactate, borax and sodium silicate, whereby separation of the endosperms is facilitated due to the substantial inhibition of swelling of the galactomannan of the endosperms during at least partial disintegration of said embryos and husks of said seeds.

References Cited in the file of this patent

UNITED STATES PATENTS

| | | |
|---|---|---|
| 1,280,634 | Barab | Oct. 8, 1918 |
| 2,557,555 | Miner | June 19, 1951 |
| 2,644,765 | Frisch et al. | July 7, 1953 |

FOREIGN PATENTS

| | | |
|---|---|---|
| 498,733 | Great Britain | Jan. 12, 1939 |
| 519,724 | Canada | Dec. 20, 1955 |